United States Patent [19]

Moreno et al.

[11] 4,070,924
[45] Jan. 31, 1978

[54] AUTOMATIC CONTROL OF LOCKABLE DIFFERENTIALS

[75] Inventors: Emil F. Moreno, Melrose Park; Ralph S. Hajek, Villa Park; Julius F. Marquardt, Westchester, all of Ill.

[73] Assignee: International Harvester Company, Chicago, Ill.

[21] Appl. No.: 688,646

[22] Filed: May 21, 1976

[51] Int. Cl.² .......................... F16H 1/44; A01B 63/10
[52] U.S. Cl. .................................................. 74/710.5
[58] Field of Search .......................... 74/710.5; 180/75

[56] References Cited

U.S. PATENT DOCUMENTS

| | | | |
|---|---|---|---|
| 2,353,554 | 7/1944 | Gates | 74/710.5 |
| 2,722,134 | 11/1955 | Cabell | 74/710.5 X |
| 2,830,670 | 4/1958 | Ferguson | 74/710.5 X |
| 2,965,181 | 12/1960 | Senkowski | 74/710.5 X |
| 3,323,389 | 6/1976 | Hause | 74/710.5 |

*Primary Examiner*—Samuel Scott
*Assistant Examiner*—Lance W. Chandler
*Attorney, Agent, or Firm*—Douglas W. Rudy; Floyd B. Harman

[57] ABSTRACT

A pilot source of fluid pressure allows the engagement of a lockable differential into a locked mode in response to a pressure signal directed to it. Metering of the signal is related to the operating condition of the implements being carried by the vehicle regardless of operator initiation of the differential locking control.

7 Claims, 3 Drawing Figures

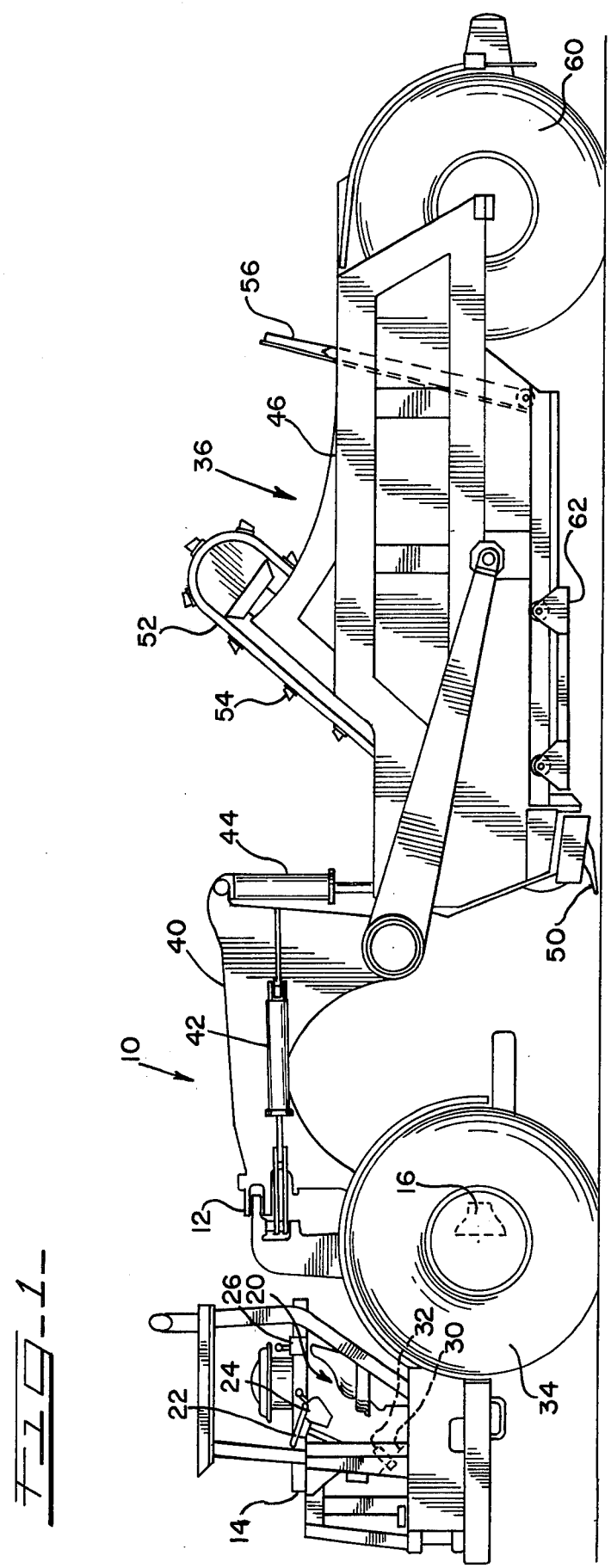

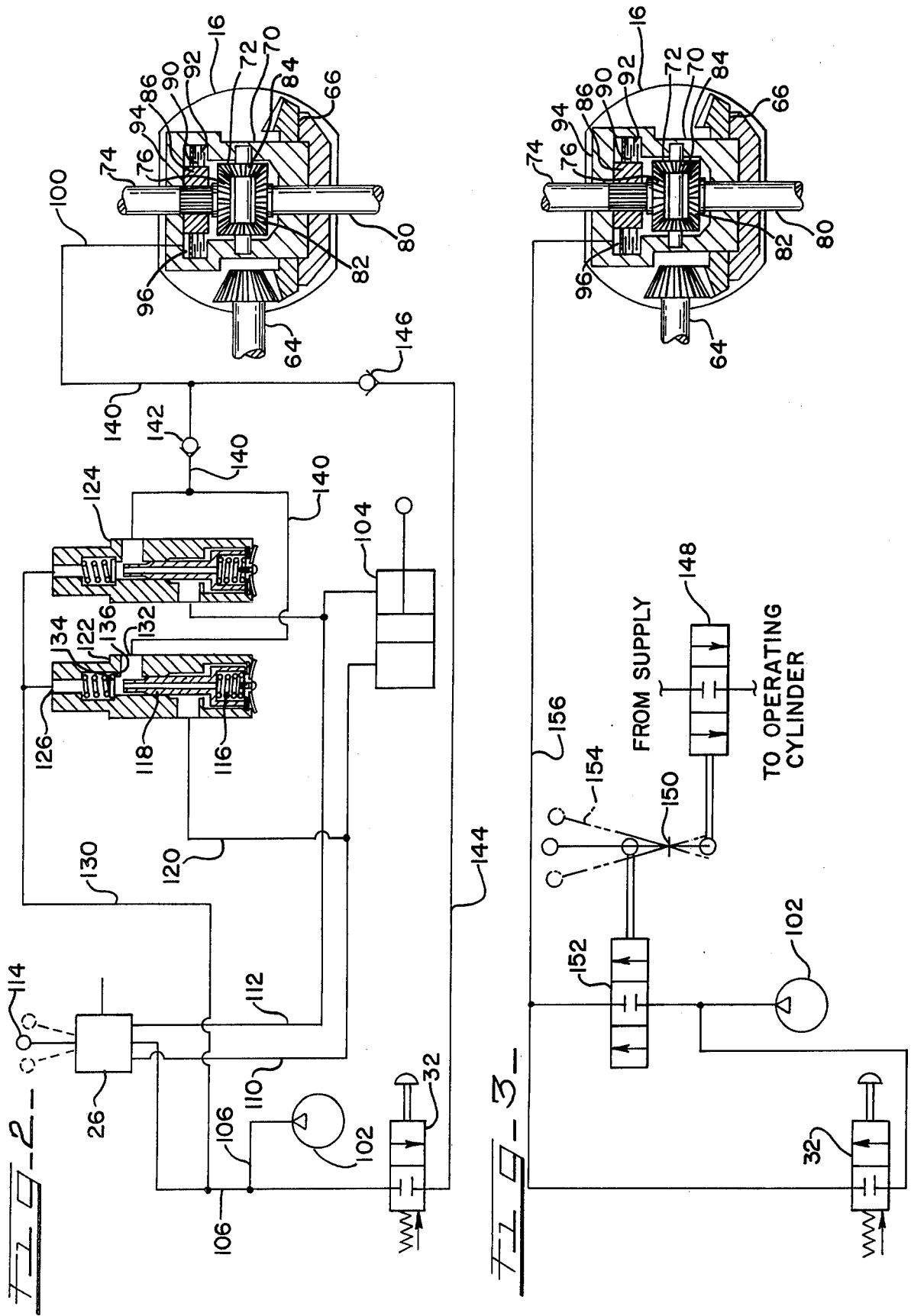

AUTOMATIC CONTROL OF LOCKABLE DIFFERENTIALS

BACKGROUND OF THE INVENTION

1. Field of the Invention

This invention relates to lockable differentials that can be locked into a non-differentialing mode. More specifically this invention is concerned with the automatic control necessary to lock a differential without direct operator action.

2. Description of the Prior Art

In heavy equipment vehicles such as used in the construction and earth-moving industry a lockable differential may be incorporated in the drive train of the vehicle. For instance, a scraper which has a forward portion with an engine and drive train as well as a rearward portion having an engine and drive train may incorporate a lockable differential in the forward portion drive train as well as in the rear portion drive train. In a scraper have only a single engine and drive train only one lockable differential would be used. The lockable differential would be activated by the scraper operator through manipulation of a differential locking control at times when the scraper requires more traction than is delivered with a traction responsive differential.

The locking function desired in the lockable differential herein described is concerned with straight line vehicle movement when it is highly advantageous to have both left and right drive wheels rotating at identical speeds without the slip of either.

The lockable differential under consideration in this application is of the type incorporating a clutch pack mounted between the spider assembly and the ring gear of a conventional differential. The clutch pack is air operated responsive to a switch under control of the vehicle operator. It should be noted that the lockable differential will perform exactly as a conventional differential until a control switch is closed manually as with contemporary systems or automatically as with the system disclosed in this invention.

The present method of operating an air lock type of lockable differential of self-loading elevator type scrapers is to have the operator operate an on-off foot valve. This valve is normally closed and is spring loaded to the closed or "off" position. In some instances of scraper operation the operators are not actuating the power train air lock differential when loading or unloading and the different gears are being damaged due to excessive wheel slippage.

The invention disclosed herein results from the need of having a lockable differential capable of being locked without cognitive action on the part of the operator. In the scraper example it would be beneficial to have the lockable differential lock up when the scraper is being loaded and the bowl is lowered to bite into the ground or when the bowl is lowered to dispense the load. As the operator has other vehicle controls to attend to during this time it is advantageous to relieve him of the duty to manually lock the differential. This is accomplished in the instant invention by having a lockable differential control switch responsive to the status of sundry or peripheral equipment of the vehicle.

There are numerous other types of vehicles and equipment that use differentials than can also benefit from the invention set forth herein. For instance, loaders, dozers, graders, dump trucks, highway trucks as well as stationary equipment using differentials may be contemplated to advantageously use the differential control of this invention.

SUMMARY OF THE INVENTION

Presented is a control circuit used to automatically initiate engagement of clutches used to lock up a lockable differential so that each of the two axles being driven through the differential will be driven at identical speeds. The manual control of a lockable differential depends on fluid pressure, either gas or liquid, supplied by a source as a pump being directed by an operator controlled switch to the pressure chamber of the air lock clutch assembly. The lockable differential is often referred to as an air lock differential, however, this application is not limited to air or gas operated lockable differentials. Fluid operated clutches are contemplated as well.

The automatic control requires that a linkage means be associated with a specified movable component of the vehicle equipment. The linkage means may be operatively associated with an operator's control valve for actuating a movable component on the vehicle. The automatic air locking circuit will be dependent on the displacement of the control valve.

A pair of pilot operated inversion valves may be used in the installation of the automatic locking control. In a pilot operated inversion valve system the inversion valves are normally kept open by air pressure in pilot lines. A release in air pressure by displacement of a control valve, normally a control valve for a movable component on the vehicle, will allow one of the inversion valves to open. The automatic air locking circuit then allows air pressure to actuate the air lock differential through suitable lines and check valves. Return of the control valve to a neutral position restores pressure to the subject inversion valve which thus stops the flow of air to the air lock differential. Air pressure in the air lock differential will drop, through normal leakage and release the differential air lock clutch.

Among various advantages of this automatic air lock differential control is the feature that the lockup operation of air lock differential may be automatically controlled during a loading and unloading cycle.

Another advantage in using the proposed system is that unnecessary damage to the air lock differential can be curtailed due to relieving the operator of the task of operating the air lock differential during the vehicle loading function.

Also an advantage to the proposed system is that it can be accomplished through the use of a minimum number of parts arranged in a simple association with each other thus minimizing the possibility of system malfunctions.

BRIEF DESCRIPTION OF THE DRAWINGS

These and other advantages of the invention will be apparent from the following description in which:

FIG. 1 presents a side elevation view of an articulated elevating scraper that incorporates the automatic control for an air lock differentials;

FIG. 2 presents one embodiment of the invention in a schematic layout with significant control elements sectioned to show that operation; and FIG. 3 is a schematic representation of an alternative method of actuating a lockable differential.

DETAIL DESCRIPTION OF THE INVENTION

The invention and the air lock differential of this invention will reside in equipment such as the self-loading scraper shown generally as 10 in FIG. 1. This machine is an articulated vehicle capable of articulation around the pivot point 12. The forward portion of the vehicle 14 contains an engine (not distinctly shown) and a drive train means including a differential 16. The forward portion of the vehicle also carries an operator's work zone, generally 20, including vehicle operating controls such as the steering wheel 22, the transmission shift lever 24, the elevator control lever 26, the accelerator pedal 30 and a differential lock switch 32 as well as an array of sundry operating controls and gauges. A pair of wheel and tire assemblies 34 are carried on axles (not shown in detail) receiving motion through the drive train means including the differential 16.

The bowl or rear sectional generally 36 is linked to the forward section at the articulation point 12. The gooseneck 40 carries a steering cylinder on each side thereof for steering the articulated vehicle. Bowl lift cylinders 44 allow the bowl to be lifted or lowered as appropriate. A cutting edge 50, when lowered into the ground, digs soil to be loaded into the bowl 46. Loading is assisted by the elevator 52 to which a series of paddles 54 are attached and are rotated into the material being loaded to assist in getting the material into the bowl. An ejector gate 56 is provided to assist in unloading the bowl when the operator so wishes. A sliding floor 62 is generally provided.

The bowl section of the vehicle is provided with a trailing axle having a pair of wheel and tire assemblies 60 supporting it. The rear axle may be driven by an auxiliary engine through a conventional drive means if desired. The scraper vehicle shown does not have the auxiliary engine and the wheels and tires 60 are supported on a tag axle only.

A schematic presentation of the automatic air lock differential locking circuit is shown in FIG. 2. This is a typical circuit and would, for instance, be incorporated in the vehicle presented in FIG. 1.

The differential 16 is associated with and operates with a drive pinion shaft 64 which supplies rotary input motion from the vehicle engine-transmission assembly to a ring gear 66. The ring gear 66 is integral with a spider carrier 70 which carries a conventional differential gear set 72. A first axle 74 is splined to a first side gear 76 while a second axle 80 is splined to a second side gear 82.

The conventional differential 16 provides that when both axles 74 and 80 are free to turn under equally resistant loads, the ring gear 66 and four spider gears, one shown as 84 (two spider gears not shown), act as a single rigid unit, transmitting torque to both the splined side gears 76 and 82. The side gears, being splined to the respective axle shafts 74 and 80 then drive each rear wheel with the same amount of torque at identical speeds. In this instance, the spider gears 84 do not rotate on their axis, therefore the side gears 76 and 82 rotate at the same rate as the ring gear 66.

When the resistance on one drive axle exceeds the resistance of the other, or when the vehicle makes a turn, the ring gear 66 continues to rotate but the spider gears 84 cease to act as a unit with the ring gear 66. The spider gears 84 now turn on their own axes and permit one axle to be driven faster than the other.

The air lock clutch consists of an internally and externally splined clutch hub 86, the internal splines of the clutch hub 86 mating with external splines on the first axle 74 such that the first axle and the clutch hub rotate integrally. A plurality of sintered faced clutch plates 90 having interal splines are carried on the external splines of the clutch hub 86. A plurality of steel clutch plates 92 are interposed between the sintered-faced clutch plates 90 and are in splined relationship with the clutch housing 94. An annular piston 96 is provided such that when air pressure is supplied behind the annular piston 96 through air line 100 the annular piston 96 will compress the sintered-faced and steel clutch plates together thus providing a locked up relationship between the first axle 74 and the ring gear 66.

When the air lock clutch is activated air under pressure is delivered to the back side of the annular piston within the clutch housing 94 in the differential. This pressurized air forces the piston to move and compress the externally splined steel clutch plates 92 (meshed with the clutch housing 94) against the internally splined sintered-faced clutch plates 90 (meshed with the clutch hub 86 which is meshed with the first axle 74) thereby creating a mechanical lockup between the axle and the clutch housing 94 which is bolted to the ring gear. Upon the release of the air pressure behind the annular piston 96 the air is exhausted from the annular piston area thereby releasing the clutch.

When the air lock differential has been engaged both the first 74 and the second 80 axles will be rotated at the same speed and torque.

The operation of automatically initiating air flow to the air lock differential is the crux of this invention and the circuitry necessary to do this is shown in FIG. 2.

An air pump 102 supplies air under pressure to the elevator control air valve 26 via conduit 106. The elevator control air valve 26 controls the elevator hydraulic drive actuating valve 104 which actuates a hydraulic drive motor for the elevator (not shown). The piston of the elevator hydraulic drive actuating valve is in neutral when it is at the mid-point of its overall travel. In order to be held in neutral, which corresponds to the neutral non-moving, non-driven driven mode of the elevator, full air supply pressure is maintained in both air line 110 and air line 112 emanating from the respective "load" and "reverse" positions of the elevator control air valve 26. The elevator control air valve 26 is a spool valve which when in a "neutral" position allows flow between the supply air line 106 and both air lines 110 and 112 connected to the elevator hydraulic drive actuating valve 104. The hydraulic drive actuating valve indexes the hydraulic drive motor (not shown) of the elevator to either run in a loading or reversing direction.

The lever 114 of the elevator control air valve 26 may be moved rearward (to the right) for loading or forward (to the left) for reversing. These positions are shown in the dotted line views of FIG. 2. When the lever 114 is moved to the "load" position the supply of air pressure to the right side chamber of the elevator hydraulic drive actuating valve 104 will be interrupted while the left side chamber remains under pressure thus urging the piston to the right in the valve. This starts the elevator moving in a loading direction.

One of the most advantageous times to lock up the differential is when the scraper is being loaded. At times when this is being done the elevator will ordinarily be running. Thus there is an operative relationship between the elevator and the differential that can be utilized to carry out this invention. It is advantageous to lock the differential when the elevator is running and that is done in the invention through the use of a pair inversion valves 122 and 124 in the circuit between the elevator and the differential.

Each inversion valve 122 and 124 is identical and conventional, therefore a description of only one valve (122) will be presented. The piston 118 is displaced against the force of a spring 116 through air pressure acting on the piston 118 which has been supplied through the first inversion valve control pressure line 120 when the lever 124 of the elevator control valve 26 is in neutral as shown by the solid line. Both the first 122 and the second 124 inversion valves are shown in this position. When the piston 118 is thus displaced, air, which would be supplied to the supply port 126 via supply conduit 130 is prevented from entering the inversion valve and passing out the delivery port 132 by valve 134 being allowed to seat on the valve seat 136. Thus air pressure is not provided to the delivery counter 140 or to the air lock clutch in the differential. The differential remains unlocked.

The air lock clutch in the differential is locked up when the lever 114 is displaced to either the "load" (broken line position to the left) or "reverse" (broken line position to the right) position. For instance, when the lever is pushed forward the air supply in air line 110 is cut off resulting in the spring 16 in the first inversion valve 122 urging the piston through its bore to displace valve 134 allowing air to flow through the inversion valve and the delivery port 132 and via the delivery conduit 140 to the air lock differential. The differential will then be locked until the lever 114 is moved back to the neutral position.

The same sequence of events would occur if the lever 114 was originally moved in the opposite direction, obviously, however, the second inversion valve 124 and its attendent supply, pilot and delivery ports and conduits would be involved.

A first check valve 142 may be installed in delivery conduit 140 to insure that air flow passes from the inversion valves to the air lock differential and not vice versa.

An alternative circuit for allowing the operator to lock the differential is also shown in FIG. 2. This circuit comprises a foot operated air valve formerly referred to as a differential lock switch 32 which is spring loaded to normally prevent the flow of air from the pump 102 via conduit 106 from passing through it. When the switch 32 is displaced, however, air pressure can be supplied to the air lock differential to lock it through alternative supply line 144 which communicates with delivery conduit 140. The second check valve 146 is interposed in alternative supply line 144 to insure air flow in the delivery direction only.

The alternative circuit is provide so that in unusual operating circumstances the operator may lock the differential at his discretion.

FIG. 3 presents a second embodiment that also allows locking of the air lock differential without active participation on the part of the vehicle operator. In FIG. 3 the differential 16 is identical with the air lock differential previously discussed in conjunction with FIG. 2. The air pump 102 likewise. In this embodiment, however, the elevator control valve 148 is operated directly by a linkage 150. To this linkage a three position air control valve 152 is attached. Moving the linkage 150 via the handle 154 to either forward or reverse (broken line representations) position will allow air flow from the air pump 102 to pass through the delivery line 156 to the air lock differential 16 and lock it up as previously described. Returning the elevator control handle 154 to its off or neutral (vertical in the figure) position will allow pressure in the differential to drop, through normal leakage, and release the air lock clutch.

The foot operated differential lock switch 32 may be retained in order to give the vehicle operator a discretionary choice over when to lock the differential when the elevator is not in motion. The choice between either embodiments is one of design preference dictated by the linkages of the elevator controls. Either embodiment provides the desired function of having the air lock differential locked without operator activity so that the operator can direct his attention to other matters.

Thus it is apparent that there has been provided in accordance with the invention an automatic control for use with lockable differentials that fully satisfies the objects, aims and advantages set forth above. While the invention has been described in conjunction with specific embodiments thereof it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In a control circuit for use in controlling a lockable differential having a manually controlled system including a pressure supply means, a manually operated valve, a one way check valve, a lockable differential and first conduit means providing a means for communicating pressure from the pressure supply means to the differential through the manually operated valve and the one way check valve, the improvement comprising an automatically engaged differential locking system comprising:

a peripheral equipment control lever;
a multi position normally closed control valve being operatively linked to the peripheral equipment control lever;
a second one way check valve permitting flow in one direction;
second conduit means allowing communication between the pressure supply means and the lockable differential through the multiposition normally closed control valve and the second one way check valve whereby displacement of the peripheral equipment control lever will result in the opening of the multiposition normally closed control valve thus resulting in transmission of pressure from the pressure supply means to lock the lockable differential.

2. The invention in accordance with claim 1 wherein the pressure supply means is a gas supply reservoir and the control circuit depends on gas pressure to lock up the lockable differential.

3. The invention in accordance with claim 1 wherein the pressure supply means is a source of hydraulic fluid and the control circuit depends on hydraulic fluid pressure to lock up the lockable differential.

4. The invention in accordance with claim 1 wherein the multipositional normally closed control valve is a spool type valve having a first position allowing flow through the valve, a second position blocking flow through the valve and the third position allowing flow through the valve.

5. The invention in accordance with claim 1 wherein the peripheral equipment control device is an elevator control valve having load, off and reverse positions and is further operatively communicative with an actuator cylinder for controlling an elevator hydraulic valve.

6. The invention in accordance with claim 1 wherein the differential locking system further comprises;
   a first and a second inversion valve, each inversion valve normally closed having a supply port receiving fluid from the supply source of fluid pressure, a control port receiving a pressure signal, a delivery port allowing fluid pressure to be communicated to the lockable differential and an exhaust port;
   second conduit means allowing fluid communication between the peripheral control device and the inversion valves, the supply source of fluid and the inversion valves, and the inversion valves and the lockable differential which also contains the first one way check valve.

7. In combination with a control circuit for use in controlling a lockable differential having a manually controlled system including a supply source of fluid pressure, of one of either of gas or liquid, a manually operated valve, a first one way check valve, a locking clutch for locking the lockable differential and first conduit means providing a means for communicating fluid from the supply source of fluid pressure to the lockable differential through the manually operated valve and the one way check valve, the improvement comprising:
   a peripheral equipment control mechanism;
   a peripheral equipment operating mechanism of a cylinder and a piston where the piston may be displaced by fluid pressure;
   a normally closed inversion valve having a supply port receiving fluid from the supply source of fluid pressure, a central port receiving a pressure signal, a delivery port allowing fluid pressure to be communicated to the lockable differential and an exhaust port;
   a second one way check valve allowing fluid to be delivered to the lockable differential; and
   second conduit means allowing fluid communication between the peripheral equipment control mechanism and the inversion valve, and the inversion valve and the lockable differential which also contains the second one way check valve whereby the lockable differential will be caused to be locked when the peripheral equipment operating mechanism interrupts the fluid flow from the supply source of fluid which results in the inversion valve allowing the passage of fluid from the supply source to the locking clutch of the lockable differential.

* * * * *